(12) United States Patent
Tojima et al.

(10) Patent No.: US 9,698,586 B2
(45) Date of Patent: Jul. 4, 2017

(54) POLE-ATTACHED CABLE RELAY CARRIAGE AND POWER SUPPLY SYSTEM TO ELECTRIC WORK MACHINE

(75) Inventors: Masanori Tojima, Fujisawa (JP); Koji Takeda, Tama (JP); Takao Nagai, Yokohama (JP); Katsuhiro Kajino, Kawasaki (JP)

(73) Assignee: Komatsu Ltd., Tokyo (JP)

( * ) Notice: Subject to any disclaimer, the term of this patent is extended or adjusted under 35 U.S.C. 154(b) by 8 days.

(21) Appl. No.: 14/117,935

(22) PCT Filed: Jun. 15, 2012

(86) PCT No.: PCT/JP2012/065428
§ 371 (c)(1),
(2), (4) Date: Nov. 15, 2013

(87) PCT Pub. No.: WO2012/173257
PCT Pub. Date: Dec. 20, 2012

(65) Prior Publication Data
US 2014/0069758 A1    Mar. 13, 2014

(30) Foreign Application Priority Data

Jun. 17, 2011  (JP) ................... 2011-134830

(51) Int. Cl.
*H02G 11/02* (2006.01)
*E02F 9/20* (2006.01)

(52) U.S. Cl.
CPC .............. *H02G 11/02* (2013.01); *E02F 9/207* (2013.01); *E02F 9/2016* (2013.01); *E02F 9/2095* (2013.01)

(58) Field of Classification Search
CPC ..................................................... H02G 11/02
See application file for complete search history.

(56) References Cited

U.S. PATENT DOCUMENTS

| 4,587,383 A | 5/1986 | Stoldt |
| 6,378,653 B1 * | 4/2002 | Takahashi ............. B66F 17/006 182/62.5 |

(Continued)

FOREIGN PATENT DOCUMENTS

| CN | 201411735 Y | 2/2010 |
| CN | 201699380 U | 1/2011 |

(Continued)

OTHER PUBLICATIONS

International Search Report dated Jul. 10, 2012, issued for PCT/JP2012/065428.

(Continued)

*Primary Examiner* — Zachary Kuhfuss
(74) *Attorney, Agent, or Firm* — Locke Lord LLP

(57) ABSTRACT

A power support system to an electric work machine includes: a cable holding unit configured to hold a cable that transmits power; a cable support pole configured to support the cable held by the cable holding unit at a position higher than a height of a vehicle that travels on a track that intersects at a position where the cable is disposed; and a travel device connected to the cable holding unit and the cable support pole and configured to perform a traveling operation so as to be able to move the cable holding unit and the cable support pole.

6 Claims, 10 Drawing Sheets

(56) References Cited

U.S. PATENT DOCUMENTS

| | | | | |
|---|---|---|---|---|
| 2007/0096538 A1* | 5/2007 | Niemi | ................... | E21C 35/24 299/1.05 |
| 2014/0027228 A1* | 1/2014 | Tojima et al. | ........... | 191/12.2 A |
| 2014/0027229 A1* | 1/2014 | Tojima et al. | ................ | 191/64 |
| 2014/0032006 A1* | 1/2014 | Tojima et al. | ................ | 700/295 |
| 2014/0041951 A1* | 2/2014 | Tojima et al. | ................ | 180/2.1 |

FOREIGN PATENT DOCUMENTS

| | | |
|---|---|---|
| JP | 54-125801 A | 9/1979 |
| JP | 05-049128 A | 2/1993 |
| JP | 05-199638 A | 8/1993 |
| JP | 07-018705 A | 1/1995 |
| JP | 08-019136 A | 1/1996 |
| JP | 2002-012395 A | 1/2002 |
| JP | 2010-065445 A | 3/2010 |

OTHER PUBLICATIONS

Office Action dated Feb. 26, 2015, issued for the Canadian Patent Application No. 2836212.
Office Action dated Feb. 12, 2015, issued for the corresponding Australian Patent Application No. 2012270473.

* cited by examiner

POLE-ATTACHED CABLE RELAY CARRIAGE AND POWER SUPPLY SYSTEM TO ELECTRIC WORK MACHINE

FIELD

The present invention relates to a pole-attached cable relay carriage and a power supply system to an electric work machine.

BACKGROUND in recent years, in terms of reduction of the fuel consumption and environmental protection, some work machines such as an excavator and the like are of electrically driven type that are driven by electric power. For example, the electric work machine disclosed in Patent Literature 1 can be supplied with power from the outside by a cable and driven by such power supplied from the outside to carry out the operation of excavation and the like at a mine and a quarry.

CITATION LIST

Patent Literature

Patent Literature 1: Japanese Patent Application Laid-open No. 2010-65445

SUMMARY

Technical Problem

Operation sites such as a quarry are often mortar-shaped and their working areas are generally narrow. Therefore, at the working site where the cable connected to an excavator is located, when the vehicle such as a dump operates and travels within the working area, the vehicle has to turn its direction within the narrow area so as not to step on the cable. In this case, increased times of the turning operations cause the reduction in the life of tires. Suppression of the reduction in the life of tires due to the increased times of the turning operations can be realized by expanding the working site, but the expanded working site is likely to cause huge time and cost.

Further, as a construction method for increasing the productivity at the quarry site and the like, while there is a useful construction method in which dumps enter both sides of an excavator and the loading operation to the dumps of both sides is made by the excavator, it will be difficult to employ this construction method when the cable is connected to the excavator. That is, when the cable is connected to the electrically driven excavator, the cable is disposed between the tracks of the dumps entering both sides of the excavator. Further, when the dumps that have entered both sides of the excavator and finished the loading operation go out of the working area, they need to turn within the working area before traveling. When the dump that finished the loading operation makes a turn, however, it is likely to step on the cable disposed between the tracks of the dumps. Therefore, it will be difficult for the dump to make a turn, which makes it difficult to employ the construction method in which the dumps enter both sides of the excavator.

The present invention has been made in view of the above and aims to provide a pole-attached cable relay carriage that can prevent the damage of the cable and a bower supply system to the electric work machine.

Solution to Problem

To overcome the problems and achieve the object, according to the present invention, a pole-attached cable relay carriage comprises: a cable holding unit configured to hold a cable that transmits power; a cable support pole configured to support the cable held by the cable holding unit at a position higher than a height of a vehicle that travels on a track that intersects at a position where the cable is disposed; and a travel device connected to the cable holding unit and the cable support pole and configured to perform a traveling operation so as to be able to move the cable holding unit and the cable support pole.

According to the present invention, the cable support pole includes a plurality of the cable support poles.

According to the present invention, the cable support pole is configured to be able to support the cable so as to change a height of the cable from a ground.

According to the present invention, the cable holding unit is configured to be able to reel up and deliver the cable, and is configured to be able to adjust a height of the cable from a around by adjusting an amount of a reeling up of the cable.

According to the present invention, the travel device is configured to perform the traveling operation by power supplied by the cable.

To overcome the problems and achieve the object, according to the present invention, a power support system to an electric work machine comprises: the pole-attached cable relay carriage; and an electric work machine driven by power supplied by the cable that is relayed by the pole-attached cable relay carriage.

Advantageous Effects of Invention

The pole-attached cable relay carriage according to the present invention can advantageously prevent the interference between the track of the vehicle and the cable and prevent damage of the cable. Further, the power supply system to the electric work machine according to the present invention can advantageously prevent the interference between the track of the vehicle and the cable and prevent damage of the cable.

DESCRIPTION OF EMBODIMENTS

Figure 1:
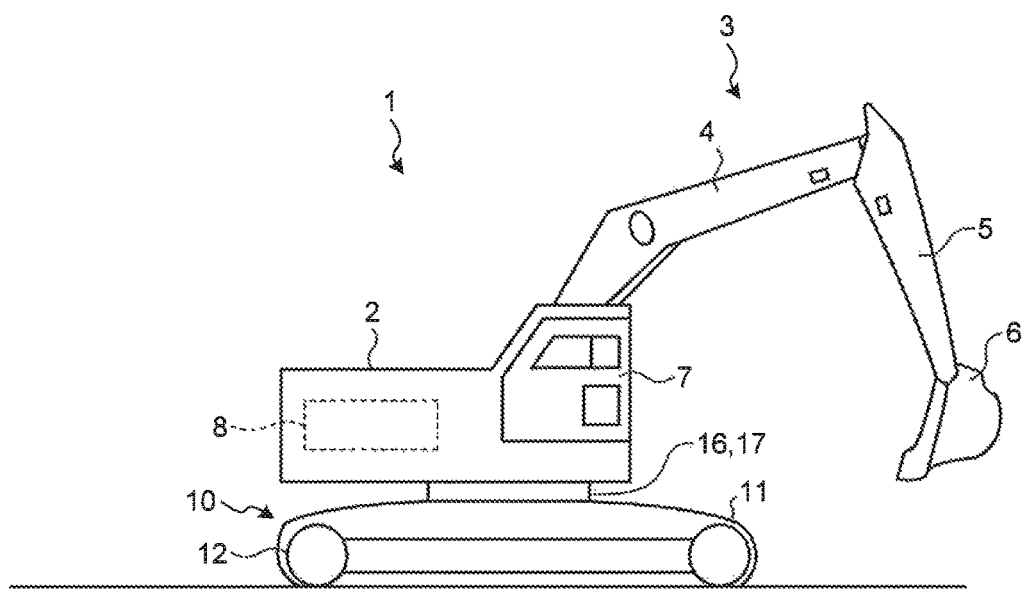
FIG. 1 is a schematic diagram of an example of a loading machine to which electric power is supplied via a relay carriage according to an first embodiment.

Embodiments of the pole-attached cable relay carriage and the power supply system to the electric work machine according to the present invention will be described in detail below by referring to the drawings. It is noted that the invention is not limited to these embodiments. Further, the components that are replaceable and obvious for those skilled in the art or the components that are substantially the same are included in the components in the following embodiments.

First Embodiment

<Arrangement of the Excavator>

FIG. 1 illustrates an example of a loading machine to which electric power is supplied via a relay carriage according to the first embodiment. An excavator 1 illustrated in FIG. 1 is an electric work machine that drives each part by the power supplied from the outside. The excavator 1 has an upper revolving body 2 and a lower traveling body 10, the upper revolving body 2 and the lower traveling body 10 are connected to a swing circle 16 that connects the both in a manner that they are able to relatively revolve. The upper revolving body 2 is attached with an work machine 3 that is an work machine including a boom 4, an arm 5, and a bucket 6. Further, the lower traveling body 10 has a left-and-right pair of crawler belts 11 and a left-and-right, pair of traveling motors 12 that are driven by electric power and drive the crawler belts 11. The excavator 1 is able to travel by driving the crawler belts 11 by the traveling motors 12 as described above.

Further, the swing circle 16 includes an electric revolving motor 17 and, in response that the electric revolving motor 17 is driven by electric power, the swing circle 16 causes the upper revolving body 2 to revolve relatively with respect to the lower traveling body 10.

Further, the upper revolving body 2 is provided with a pump unit 8 including a hydraulic pump (not illustrated) generating a hydraulic pressure and a hydraulic pressure generating electric motor (not illustrated) configured to drive the hydraulic pump by electric power. The work machine 3 provided to the upper revolving body 2 drives the hydraulic pressure generating electric motor by electric power, which allows the hydraulic pressure generated by the pump unit 8 to be applied to respective hydraulic cylinders used in the boom 4, the arm 5, and the bucket 6 via a control valve, and respective operations are made by the expansion and contraction of the hydraulic cylinders.

It is noted that, with respect to the electrically operated part of the electric work machine, the parts other than those related to the revolving may be driven or, alternatively, the revolving of the upper revolving body 2 only may be electrically operated, likewise in the case where the upper revolving body 2 is revolved or the work machine 3 is driven. That is, any parts may be operated by electric power.

A driver seat 7 of the excavator 1 is provided to the upper revolving body. When driving the excavator 1, the driver boards the driver seat 7 and drives it by making the driving operation to the devices such as levers used in the driving.

<Arrangement of the Relay Carriage>

Figure 2:
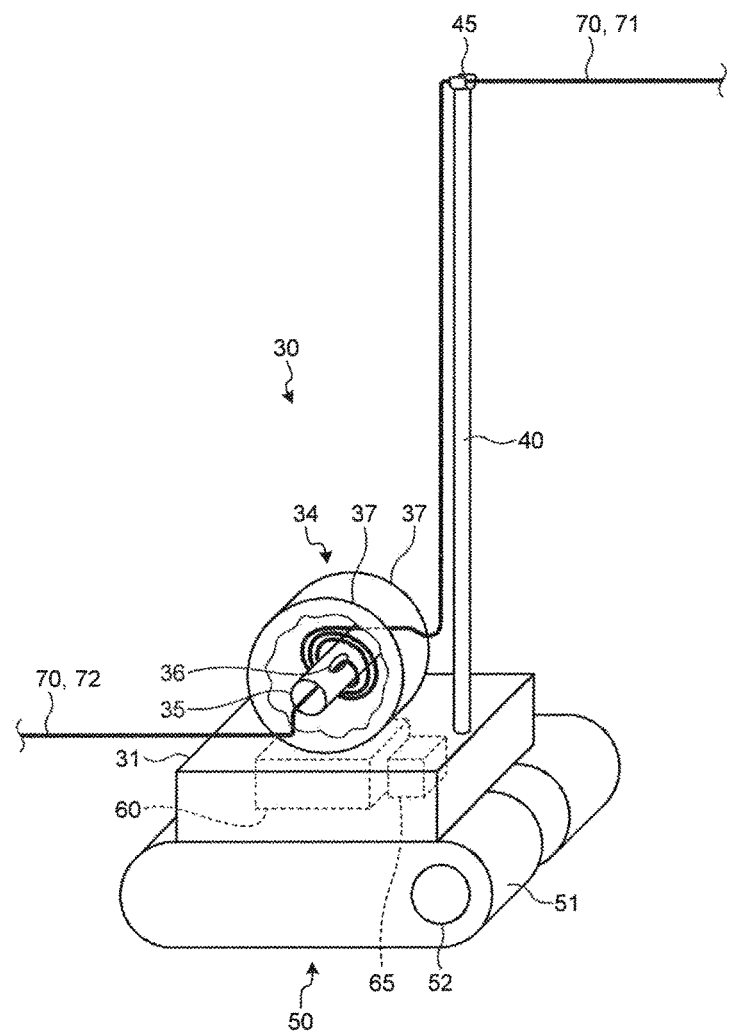
FIG. 2 is a schematic diagram of the relay carriage according to the first embodiment.

FIG. 2 is a schematic diagram of the relay carriage according to the first embodiment. A relay carriage 30 illustrated in FIG. 2 is used for the relay of the cable connected to the excavator 1 and is configured to be a pole-attached cable relay carriage that is able to travel by itself. The relay carriage 30 has a cable drum 34 that is a cable holding unit configured to hold a cable 70 by reeling up the cable 70 that is used for power transmission, and a travel device 50 is connected to a carriage body 31 on which the cable drum 34 is mounted, so that the relay carriage 30 is configured to travel by itself.

The cable drum 34 has a shaft 35 formed with so called approximate cylindrical shape whose inside is a hollow, and a part of the shaft 35 is formed with an opening 36 for communicating the inside and the outside of the shaft 35. The cable drum 34 has a guide 37 that restricts the reeling range in the axial direction of the shaft 35 when reeling up the cable 70. The guide 37 is formed with an approximate disc shape, and the center axis of the disc (the axis passing the center of figure or the center of gravity of the disc) is provided at both ends of the shaft 35 so as to correspond to the center axis of the shaft 35. The cable drum 34 provided as described above is disposed such that the center axis of the shaft 35 is directed orthogonal to the traveling direction in the traveling of the relay carriage 30.

One end of the cable 70 is inserted from the opening 36 of the shaft 35 into the inside of the shaft 35. The cable drum 34 is able to reel up the cable 70 by winding the cable 70 around the outer circumference of the shaft 35. With respect to the cable 70 to be reeled up by the cable drum 34, the end which is inserted into the inside of the shaft 35 of the cable drum 34 is pulled out from the end of the shaft 35 to the outside of the shaft 35. Therefore, one end of the cable 70 extends outside the cable drum 34 from the part reeled up on the outer circumference of the shaft 35, and the other end extends outside the cable drum 34 from the end of the shaft 35.

Further, the cable drum 34 is mounted on the carriage body 31 in a rotatable manner around the rotation axis of the cylindrical shape by the external force, and this rotation allows the cable drum 34 to adjust the amount of the reeling up of the cable 70.

The relay carriage 30 has a cable support pole 40 that supports the cable 70 held by the cable drum 34. The cable support pole 40 is provided to the carriage body 31. Specifically, the cable support pole 40 is formed with bar-like shape, one end of which is connected to the carriage body 31, and the other is extended upward from the carriage body 31. That is, the cable support pole 40 is connected to the carriage body 31 at its lower end. Further, the upper end of the cable support pole 40 extended upward from the carriage body 31 is a cable support part 45 configured to support the cable 70.

The cable support pole 40 supports one end side which extends outward of the cable drum 34 in the cable 70 held by the cable drum 34. For example, the cable support pole 40 supports, at a pole side part 71, the part of the cable 70 extending; outward of the cable drum 34 from the part reeled up on the outer circumference of the shaft 35. In contrast, in the cable 70, the part extending outward of the cable drum 34 from the end of the shaft 35 is not supported by the cable support pole 40 and extends outward of the relay carriage 30 at a non-supported side part 72.

It is noted that the pole side part 71 and the non-supported side part 72 may be opposite, that is, the part extending outward of the cable drum 34 from the end the shaft 35 may be the pole side part 71 and the part extending outward of the cable drum 34 from the part reeled up on the outer circumference of the shaft 35 may be the non-supported side part 72.

The cable support part 45 supporting the cable 70 is formed with an approximate U-shape member having a predetermined width, and is disposed at the upper part of the cable support pole 40 with the opening part of the U-shape directed upward. The cable support part 45 supports the cable 70 so that the cable 70 is inserted from the opening of the U-shape to the inside of the U-shape with the cable 70 being not fixed. Further, the cable support pole 40 supports the cable 70 at a higher position than the height of the vehicle whose track intersects the position where the cable 70 is disposed among the vehicles traveling in the working site where the relay carriage 30 is used.

The travel device 50 has a left-and-right pair of crawler belts 51 and a left-and-right pair of traveling motors 52 for driving the crawler belts 51, and performs a traveling operation by driving the crawler belts 51 by the traveling motors 52. The relay carriage 30 mounts a battery (not illustrated) thereon that serves as a power source to the relay carriage 30, and the traveling motors 52 are driven by the power supplied from the battery. Further, the travel device 50 is connected to the carriage body 31 on which the cable drum 34 and the cable support pole 40 are mounted and, therefore, the travel device 50 is connected to the cable drum 34 and the cable support pole 40 via the carriage body 31. Thus, the travel device 50 performs the traveling operation so as to move the cable drum 34 and the cable support pole 40 by driving the traveling motors 52, and the relay carriage 30 is able to travel by this traveling operation. It is noted that, while the crawler belts 51 are preferably used for the travel device 50 as described above, other forms than the crawler belts such as tires may be employed.

The relay carriage 30 is able to travel by the traveling operation of the travel device 50, and the pole side part 71 and the non-supported side part 72 of the cable 70 extend toward mutually opposite directions in the traveling direction of the relay carriage 30.

Further, the cable support pole 40 is disposed near the end of the carriage body 31 at which the pole side part 71 of the cable 70 extends in the traveling direction of the relay carriage 30. In other words, the pole side part 71 of the cable 70 is disposed so as to extend to the cable support pole 40 side in the traveling direction of the relay carriage 30.

Further, the relay carriage 30 has a control reception device 65 configured to receive the control signal from the outside. The control reception device 65 is able to receive the control signal transmitted from a remote operation device (not illustrated) operated by the driver of the excavator 1 and/or the operator and the like in the working site from which the relay carriage 30 can be viewed. The control reception device 65 provided as described above is mounted on the relay carriage 30 and connected to an electronic control device 60 configured to control each unit of the relay carriage 30. The traveling motors 52 of the travel device 50 are also connected to the electronic control device 60.

Figure 3:
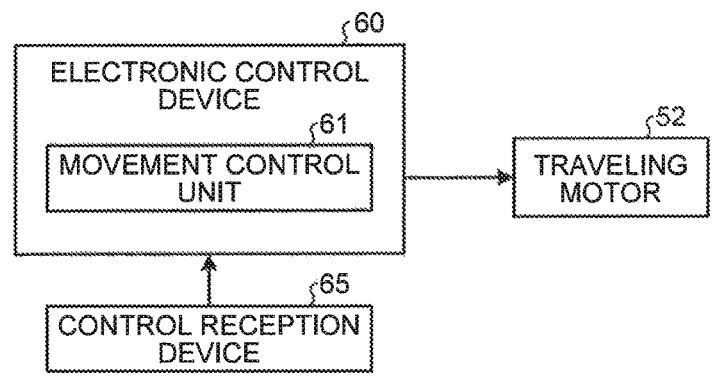
FIG. 3 is a block diagram of a main part of the relay carriage illustrated in FIG. 2.

FIG. 3 is a block diagram of the main part of the relay carriage illustrated in FIG. 2. The electronic control device 60 is provided with a processing unit having a CPU (Central Processing Unit) and the like, a storage unit such as a RAM (Random Access Memory) and the like, and an input and output unit, which are connected to each other and able to communicate the signals to each other. The processing unit of the electronic control device 60 provided as described above includes a movement control unit 61 that is the movement control means configured to provide the movement control to the travel device 50. The electronic control device 60 communicates the signals to the traveling motors 52 and the control reception device 65, which allows for the controls of respective units.

<Connection of the Cable Using the Relay Carriage>

Figure 4:
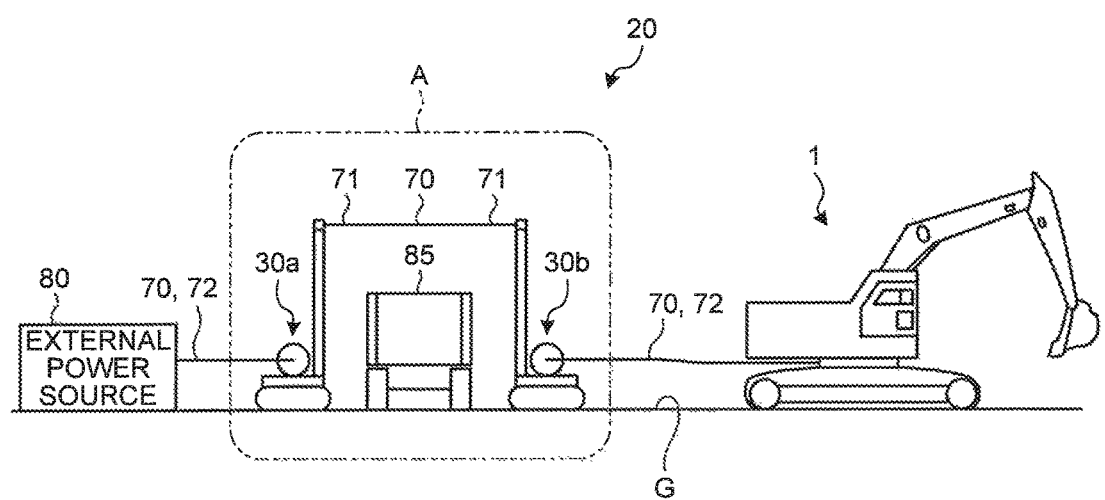
FIG. 4 is a schematic diagram illustrating a state where the relay carriage and an excavator are connected by a cable.
Figure 5:
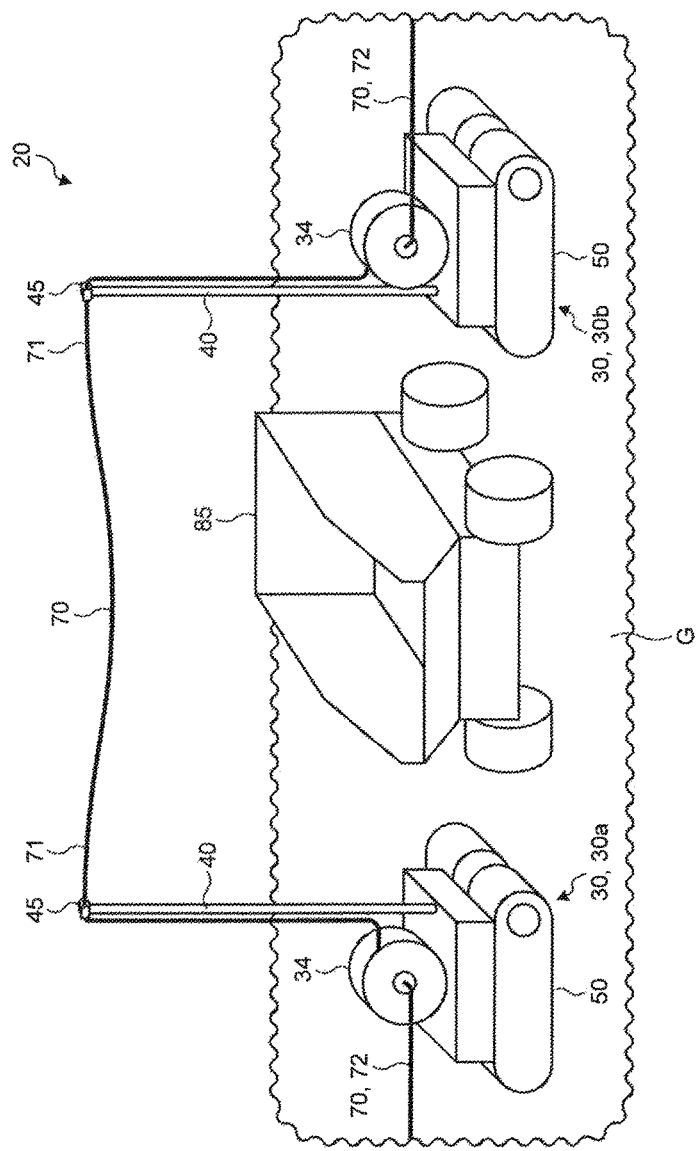
FIG. 5 is a detailed diagram of part A of FIG. 4.

The relay carriage 30 according to the first embodiment is configured as described above, and its operation will be described below. FIG. 4 is a schematic diagram illustrating a state where the relay carriage and the excavator are connected by the cable and a schematic diagram of the power supply system to the excavator. FIG. 5 is a detailed diagram of part A of FIG. 4. In a system 20 for supplying power to the excavator 1, the relay carriage 30 is used to supply power to the excavator 1. In the used of the relay carriage 30, a plurality of relay carriages 30 are interposed between an external power source 80, which is a power source at the operation of the excavator 1, and the excavator 1 and they are electrically connected. For example, assuming that two relay carriages 30 are used, the non-supported side part 72 of the cable 70 held by the cable drum 34 of a power source side relay carriage 30*a* is connected to the external power source 80.

Both of the power source side relay carriage 30*a* and an excavator side relay carriage 30*b*, which is the relay carriage 30 located near the excavator 1, extend the part of the pole side part 71 of the cable 70 in the direction of the other relay carriage 30. That is, the power source side relay carriage 30*a* and the excavator side relay carriage 30*b* are connected via the cable 70 held by the cable drums 34 of both sides, and the cable 70 located between the relay carriages 30 is the part supported by the cable support poles 40 of both relay carriages 30. Thus, the cable 70 located between the power source side relay carriage 30*a* and the excavator side relay carriage 30*b* is in a state of being bridged between the cable support parts 45 of both cable support poles 40.

Further, the non-supported side part 72 of the cable 70 held by the cable drum 34 of the excavator side relay carriage 30*b* is connected to the excavator 1. The non-supported side part 72 is connected to the lower traveling body 10 of the excavator 1, for example. Thus, the external power source 80 and the excavator 1 are in a state of being electrically connected by the cable 70 held by the power source side relay carriage 30*a* and the excavator side relay carriage 30*b* interposed between the both.

<Operation of the Excavator>

The excavator 1 that is an electric work machine is operated by the power supplied to the excavator 1 is the two relay carriages 30 as described above. That is, the power from the external power source 80 is transmitted from the non-supported side part 72 in the cable 70 held by the power source side relay carriage 30*a* to the pole side part 71 via the part held by the cable drum 34. Further, the part serving as the pole side part 71 in the power source side relay carriage 30*a* is also serving as the pole side part 71 in the excavator side relay carriage 30*b* and held by the cable drum 34 of the excavator side relay carriage 30*b*. Therefore, the power transmitted by the non-supported side part 72 from the power source side relay carriage 30*a* side is transmitted to the cable 70 of the part held by the cable drum 34 of the excavator side relay carriage 30*b*, and the power is further transmitted to the non-supported side part 72 of the cable 70.

The non-supported side part 72 of the cable 70 held by the cable drum 34 of the excavator side relay carriage 30*b* is connected to the excavator 1, so that the power flowing in the cable 70 is supplied to the excavator 1. The excavator 1 is operated by the power from the external power source 80 supplied via the two relay carriages 30 as described above.

For example, the excavator 1 can be operated by the operation by the driver in the driver seat 7 and, therefore, when the boom 4, the bucket 6, and so on are operated by the operation, the pump unit 8 is activated by the power supplied via two relay carriages 30 to activate the hydraulic cylinder and the like. This allows the excavator 1 to perform any operation to carry out the operation such as excavation.

Further, when revolving the upper revolving body 2 of the excavator 1, the driver can drive the electric revolving motor 17 by the power supplied via the relay carriage 30 by performing the operation for the revolving. This allows the upper revolving body 2 to revolve relatively with respect to the lower traveling body 10.

Further, since the excavator 1 is able to travel by the driving of the lower traveling body 10, the entire excavator 1 is moved to any position when operated in the working site. Also in this case, similarly to the case of operating the bucket 6 and the like, the operator can activate the traveling motors 12 by the power supplied via the two relay carriages 30 by performing the operation for moving the excavator 1. At this time, since the traveling motors 12 are provided in a left-and-right pair, the independent activation of the left and right traveling motors 12 allows for performing the movement control to any directions including the traveling direction.

<Support of the Cable by the Relay Carriage>

The two relay carriages 30 hold the cable 70 connecting the external power source 80 and the excavator 1, and the cable 70 is bridged between the cable support poles 40 of respective relay carriages 30. At this time, the cable support pole 40 supports the cable 70 by the cable support part 45 located at the upper end of the cable support pole 40 and thus supports the cable 70 at the high position that is distant upward from the ground G on which the relay carriages 30 are located. Therefore, the part bridged between the cable support poles 40 of the cable 70 is disposed at the position that is distant upward from the ground G and between the power source side relay carriage 30a and the excavator side relay carriage 30b.

In the working site where the excavator 1 provides the operation of the excavation and the like, other vehicles (not illustrated) such as a dump truck, a service car, a wheel loader for leveling the ground of the working site, and so on may travel and, when these vehicles pass between the relay carriages 30, they can pass under the cable 70 that is distant upward from the ground G. That is, since the cable 70 is distant upward from the ground G on which the relay carriages 30 are located, a space is formed between the cable 70 and the ground G. The vehicles other than the relay carriages 30 pass through the space between the cable 70 and the ground G for the track on the ground G under the cable 70.

For example, assuming that a dump truck 85 is a vehicle that travels the working site where the excavator 1 operates, when the dump truck 85 passes through the position where the cable 70 bridged between the relay carriages 30 is disposed, the dump truck 85 passes under the cable 70. Thus, the cable support pole 40 supports the cable 70 at the position higher than the dump truck 85 that is the vehicle whose track intersects the position where the cable 70 is disposed. This allows the dump truck 85 to pass under the cable 70. Therefore, when turning the direction after the stones and the like excavated by the excavator 1 are loaded to the dump truck 85 by the excavator 1, the dump truck 85 can pass under the cable 70 supported by the cable support pole 40 and turn the direction to travel to the desired direction.

<Traveling of the Relay Carriage>

While the excavator 1 can be traveled by activating the traveling motors 12, the excavator 1 and two relay carriages 30 are connected by the cable 70. Therefore, the excavator side relay carriage 30b or both of two relay carriages 30 are required to move along with the excavator 1 when the excavator 1 travels. Since the relay carriages 30 are able to travel by themselves, the relay carriages 30 are moved if necessary when the excavator 1 travels. In this case, the operator and the like of the excavator 1 operates the remote operation device to cause the relay carriages 30 to travel by the remote operation.

That is, the movement control unit 61 of the electronic control device 60 performs the movement control based on the movement control signal received by the control reception device 65 of the relay carriage 30. For example, when the excavator side relay carriage 30b is traveled, the movement control unit 61 of the excavator side relay carriage 30b is instructed to control the traveling motors 52 of the travel device 50 of the excavator side relay carriage 30b based on the control signal received by the control reception device 65 of the excavator side relay carriage 30b and cause the excavator side relay carriage 30b to travel. In this case, the power supplied from the battery mounted on the excavator side relay carriage 30b is used for the power for activating the traveling motor 52, and the travel device 50 performs the traveling operation by the power from the battery. Specifically, by adjusting the driving force generated by the left and right traveling motors 52, the movement control unit 61 moves the excavator side relay carriage 30b in any direction while keeping the relative distance between the excavator side relay carriage 30b and the excavator 1.

Further, when the excavator side relay carriage 30b moves as described above, the power source side relay carriage 30a is moved in a similar manner. That is, the driver and the like of the excavator 1 operates the remote operating device so as to move the power source side relay carriage 30a to transmit the movement control signal from the remote operating device. The power source side relay carriage 30a receives the movement control signal by the control reception device 65 and controls the traveling motors 52 of the travel device 50 by the movement control unit 61 based on the received movement control signal. This causes the power source side relay carriage 30a to travel according to the remote operation by the remote operating device. In this case, the power of the battery mounted on the power source side relay carriage 30a is used for the power for activating the traveling motors 52. This allows the power source side relay carriage 30a to move in any direction while keeping the relative distance between the bower source side relay carriage 30a and the excavator side relay carriage 30b.

Advantage of the First Embodiment

In the relay carriage 30 according to the above-described first embodiment, the cable support pole 40 supports the cable 70 at a higher position than the height of the vehicle such as the dump truck 85 whose track intersects the position where the cable 70 is disposed, so that such vehicle can pass under the cable 70. Further, the relay carriage 30 is able to move the cable drum 34 holding the cable 70 used for power transmission by the traveling operation of the travel device 50. Therefore, when the excavator 1 travels, the travel device 50 is caused to perform the traveling operation and thus the relay carriage 30 having the cable drum 34 can be moved according to the movement of the excavator 1, which prevents the excessive large tension in the cable 70. As a result, the interference between the track of the vehicle and the cable 70 is prevented, which can prevent the damage of the cable 70.

Further, the system 20 for supplying power to the excavator 1 according to the above-described first embodiment supports the cable 70 by the cable support pole 40 of the relay carriage 30 and drives the excavator 1 by the power supplied by the cable 70 relayed by the relay carriage 30. Therefore, the cable 70 that supplies power to the excavator 1 is supported at the position higher than the height of the dump truck 85, so that the dump truck 85 can pass under the cable 70. As a result, the interference between the track of the vehicle such as the dump truck 85 and the like and the cable 70 is prevented, which can prevent the damage of the cable 70.

Further, when the cable 70 is used to supply the power to the excavator 1, the dump truck 85 can travel under the cable 70, so that, when changing its direction, the dump truck 85 can pass under the cable 70 to make the turning operation. Therefore, the number of turning operations is reduced, so that the working site is not required to be expanded, which can prevent the increased working time and cost. Further, the dump truck 85 is able to pass under the cable 70 to easily change its direction, so that the dump truck 85 can easily go in and out the working site even when the dump trucks 85 are arranged in both sides of the excavator 1. Therefore, when the loading operation from the excavator 1 to the dump trucks 85 is made, the continuous loading operation can be made to the dust trucks 85 in both sides of the excavator 1, which allows for the improved productivity. Further, the wheel loader is able to travel under the cable 70 even when a rock fall occurs in the working site, so that the stones can be removed by the wheel loader without requiring the excavator 1 to be moved. As a result, an increase in the operation time and cost can be prevented while preventing the damage in the cable 70, which allows for the improved productivity.

Second Embodiment

While a relay carriage 90 according to the second embodiment has substantially the same arrangement as the relay carriage 30 according to the first embodiment, it features in that a cable support pole 95 is provided so as to be able to expand and contract. Since other components are the same as those in the first embodiment, the description thereof will be omitted and leveled with the same reference numerals.

<Arrangement of the Relay Carriage>

Figure 6:
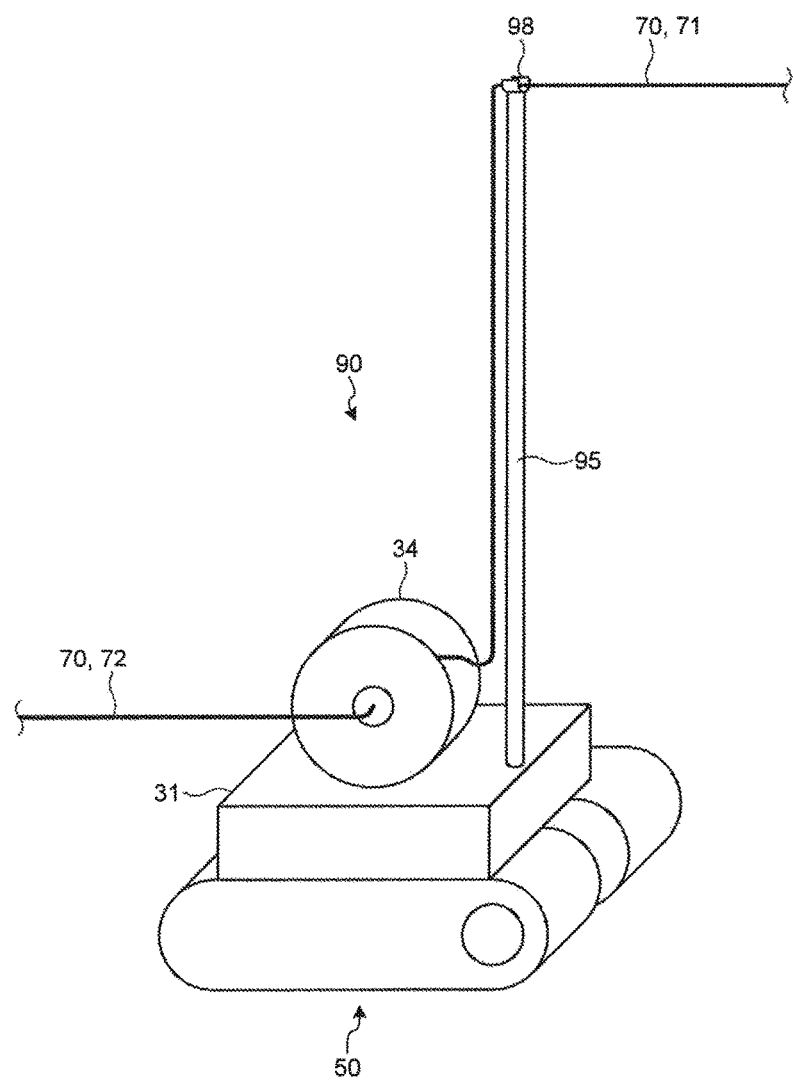
FIG. 6 is a schematic diagram of a relay carriage according to an second embodiment.
Figure 7:
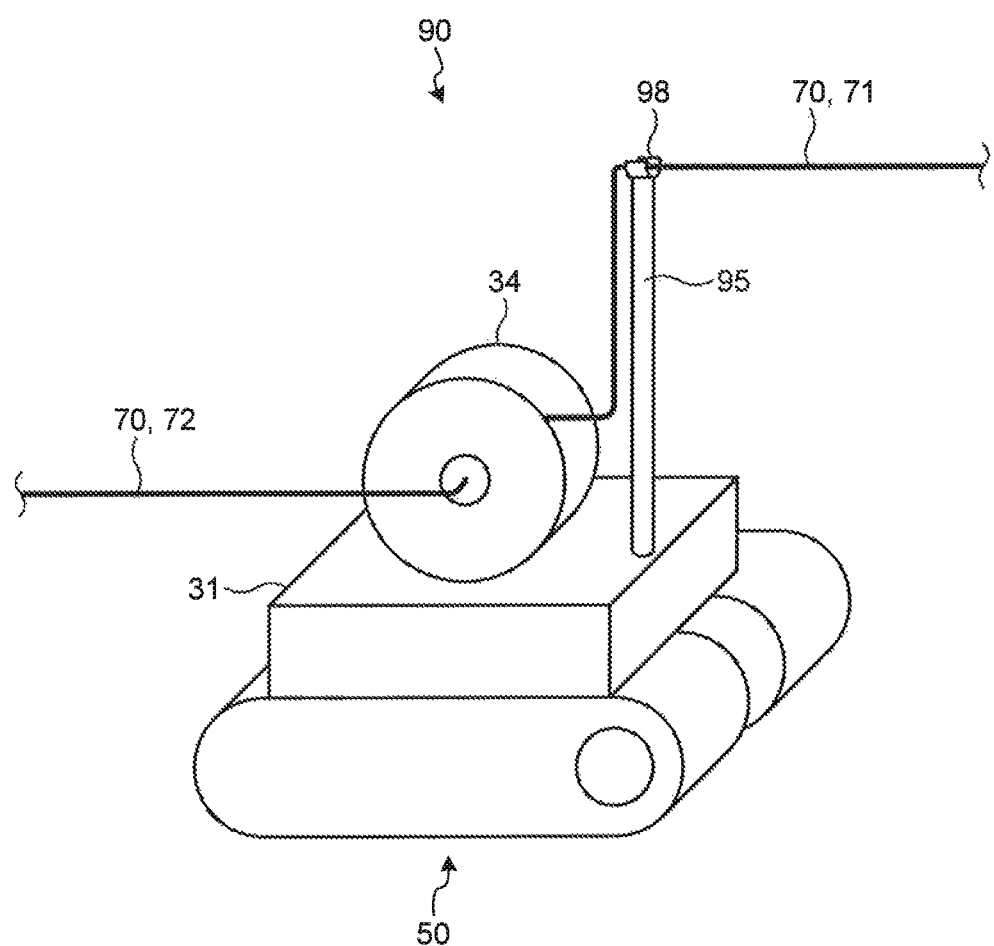
FIG. 7 is a schematic diagram illustrating a state where a cable supporting member illustrated in FIG. 6 is contracted.

FIG. 6 is a schematic diagram of the relay carriage according to the second embodiment. FIG. 7 is a schematic diagram illustrating a state where the cable supporting member illustrated in FIG. 6 is contracted. The relay carriage 90 according to the second embodiment is mounted with the cable drum 34 holding the cable 70 and has the carriage body 31 connected to the travel device 50, similarly to the relay carriage 30 according to the first embodiment. Further, while the carriage body 31 is provided with the cable support pole 95 that supports the cable 70, the cable support pole 95 is different from the cable support pole 40 provided to the relay carriage 30 according to the first embodiment and is provided so that the entire body is able to expand and contract by an actuator (not illustrated) actuated by electric power, hydraulic pressure, or air pressure. For example, the cable support pole 95 is able to expand and contract by the telescopic mechanism. That is, the cable support pole 95 is arranged with a plurality of cylindrical members having different diameters, respectively, and is connected so as to be able to relatively move in the longitudinal direction of the cylinder shape in such a manner that the member of the relatively smaller diameter is inserted inside the member of the relatively larger diameter and thus both members overlap to each other in the radial direction. This allows the cable support pole 95 to expand and contract its entire body.

The cable support pole 95 is connected to the carriage body 31 at its lower end and extends upward, so that it is provided such that its expansion and contraction allows for the variable height of the upper end from the carriage body 31 or from the ground G. Such cable support pole 95 that is able to expand and contract has a cable support part 98 at its upper end and thus is able to change the height of the cable support part 98 by the expansion and contraction. Therefore, the height of the cable support part 98 from the ground G can be increased (FIG. 6) when the cable support pole 95 is expanded, while the height of the cable support part 98 from the ground G can be reduced (FIG. 7) when the cable support pole 95 is contracted. That is, the cable support pole 95 is able to support the cable 70 with changing the height of the cable 70 from the ground G by the expansion and contraction of the cable support pole 95.

Figure 8:
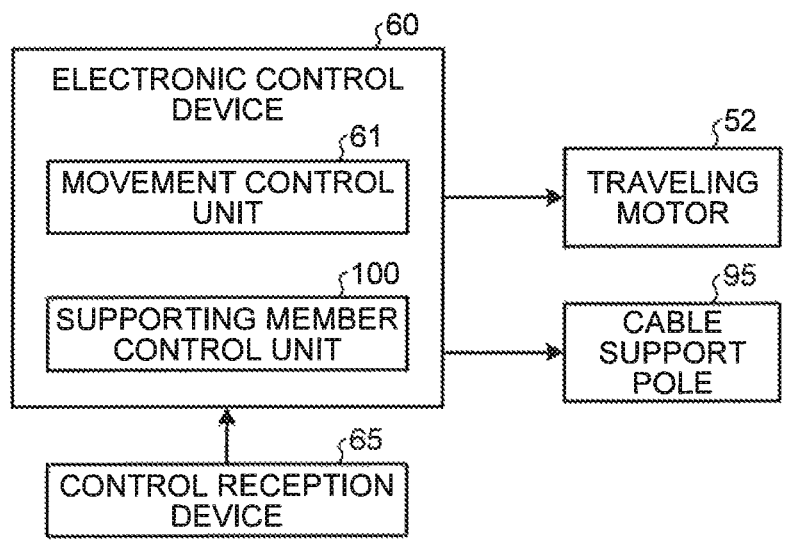
FIG. 8 is a block diagram of a main part of the relay carriage illustrated in FIG. 6.

FIG. 8 is a block diagram of the main part of the relay carriage illustrated in FIG. 6. The control reception device 65 that is able to receive the control signal from the remote operating device is connected to the electronic control device 60 of the relay carriage 90 according to the second embodiment. Further, in the electronic control device 60, the processing unit has the movement control unit 61 and further has a supporting member control unit 100 for controlling the expansion and contraction of the cable support pole 95. Further, the actuator that causes the cable support pole 95 to expand and contract is connected to the electronic control device 60, and the expansion and contraction of the cable support pole 95 can be controlled by the electronic control device 60.

The relay carriage 90 according to the second embodiment has the above-described arrangement and its operation will be described below. When the relay carriage 90 according to the second embodiment is used, the cable 70 for the electrical connection between the external power source 80 and the excavator 1 is held by a plurality of relay carriages 90 as in the relay carriage 30 according to the first embodiment. This allows for supplying power from the external power source 80 to the excavator 1 by the cable 70 held by the plurality of relay carriages 90, and the excavator 1 carries out each operation by this power.

<Expansion and Contraction of the Cable Support Pole>

Further, the supporting member control unit 100 of the electronic control device 60 of the relay carriage 90 according to the second embodiment performs the expansion and contraction of the cable support pole 95 based on the control signal from the remote operating device. For example, when the excavator 1 is not traveling and thus the relay carriage 90 is not moving, the operator operating the remote operating device performs the input operation to the remote operating device so as to cause the cable support pole 95 to expand. The remote operating device in which the input operation for causing the cable support pole 95 to expand has been performed transmits the control signal, and the supporting member control unit 100 controls the cable support pole 95 based on the expanding control signal received by the control reception device 65 to cause the cable support pole 95 to be in an expansion state (see FIG. 6). This allows for the higher position of the cable support part 98 in the cable support pole 95 and, therefore, the position of the cable 70 supported by the cable support part 98 is also significantly distant upward from the ground G. Therefore, the space through which other vehicles pass can be maintained under the cable 70 supported by the cable support pole 95.

In contrast, when the excavator 1 starts moving and the relay carriage 90 is moved accordingly while the cable 70 connecting the excavator 1 to the external power source 80 is held by a plurality of relay carriages 90, the operator for operating the remote operating device performs the input operation for contracting the cable support pole 95. In this case, the supporting member control unit 100 controls the cable support pole 95 based on the expansion and contraction signal received by the control reception device 65 to cause the cable support pole 95 to be in a contraction state (see FIG. 7). This allows for the lowered position of the cable support part 98 of the cable support pole 95, and the position of the cable support part 98 is close to the ground G. As such, when the cable support pole 95 is contracted, the height of the center of gravity from the ground G is lowered in the cable support pole 95, so that the height of the center of gravity of the entire relay carriage 90 is also lowered.

When the relay carriage 90 moves, the traveling operation is made by the travel device 50 while the cable support pole 95 is contracted and the height of the center of gravity of the relay carriage 90 is lowered. Further, when the relay carriage 90 has been moved to the desired position with the cable support pole 95 being contracted and the movement of the relay carriage 90 has been stopped, the cable support pole 95 is again expanded by the remote operation. This allows for the space through which other vehicles pass is maintained under the cable 70 supported by the cable support pole 95 when the relay carriage 90 is stopped.

Advantage of the Main Part of the Second Embodiment

The relay carriage 90 according to the above-described second embodiment is able to change the height of the cable 70 to support it by expanding and contracting the cable support pole 95, so that, the expansion of the cable support pole 95 allows the cable 70 to be supported at a higher position when the relay carriage 90 is stopped. This further ensures that other vehicles can pass under the cable 70. Further, the contraction of the cable support pole 95 allows for the decreased height of the center of gravity in the relay carriage 90 when the relay carriage 90 is moved in response to the movement of the excavator 1. This allows for the improved stability when the relay carriage 90 moves, and allows for the movement at a higher speed compared to the movement under the state where the cable support pole 95 is expanded. This further ensures to prevent the damage of the cable 70 and allows for the improved stability when the relay carriage 90 moves. Further, such the improved stability when the relay carriage 90 moves allows for further faster movement of the relay carriage 90, so that the relay carriage 90 can be moved to a more proper position and the entire operation time can be reduced according to the reduction in the time required for the movement.

Modified Embodiment

Although the cable drum 34 is provided in a rotatable manner by the external force in the above-described relay carriages 30 and 90, the cable drum 34 may be provided in a self rotatable manner. For example, an electric motor (not illustrated) driven by electric power may be connected to the cable drum 34, and the cable drum 34 may be provided in a rotatable manner around the rotation axis of the cylindrical shape by the driving of the electric motor. The cable drum 34 rotates by the driving force of the electric motor and thus is able to reel up and deliver the cable 70.

Further, when the cable drum 34 is electrically rotatable, it is preferable that the cable drum 34 is connected to the electronic control device 60 similarly to the traveling motor 52, so that the remote operation by the remote operating device can be made. As described above, the cable drum 34 that is rotatable by the remote operation further ensures to maintain the height of the cable 70 from the ground G.

For example, when the distance between the relay carriages 30, 90 is longer than the length of the cable 70 located between the both when the relay carriages 30, 90 are moved in response to the movement of the excavator 1, the cable 70 is delivered from the cable drum 34. In contrast, when the distance between the relay carriages 30, 90 is shorter than the length of the cable 70 located between the both, the amount of reeling up of the cable 70 by the cable drum 34 is increased. This allows the length of the cable 70 located between the relay carriages 30, 90 to be a suitable length for the distance between the relay carriages 30, 90.

As described above, when the excavator 1 moves, besides the adjustment of the distance between the excavator 1 and the relay carriage 30 or between the relay carriages 30 by the movement of each relay carriage 30, 90 by the remote operation, the cable drum 34 of each relay carriage 30, 90 is remotely controlled in necessity to adjust the amount of reeling up of the cable 70. This allows for the adjustment of the height of the cable 70 bridged between the cable support poles 40, 95 of the relay carriages 30, 90, and thus the distance between the cable 70 and the ground G can be maintained at the distance through which the vehicle other than the relay carriage 30, 90 can pass. Therefore, it further ensures to prevent the damage of the cable 70, which allows for the interference between the track of the vehicle and the cable 70.

Figure 9:
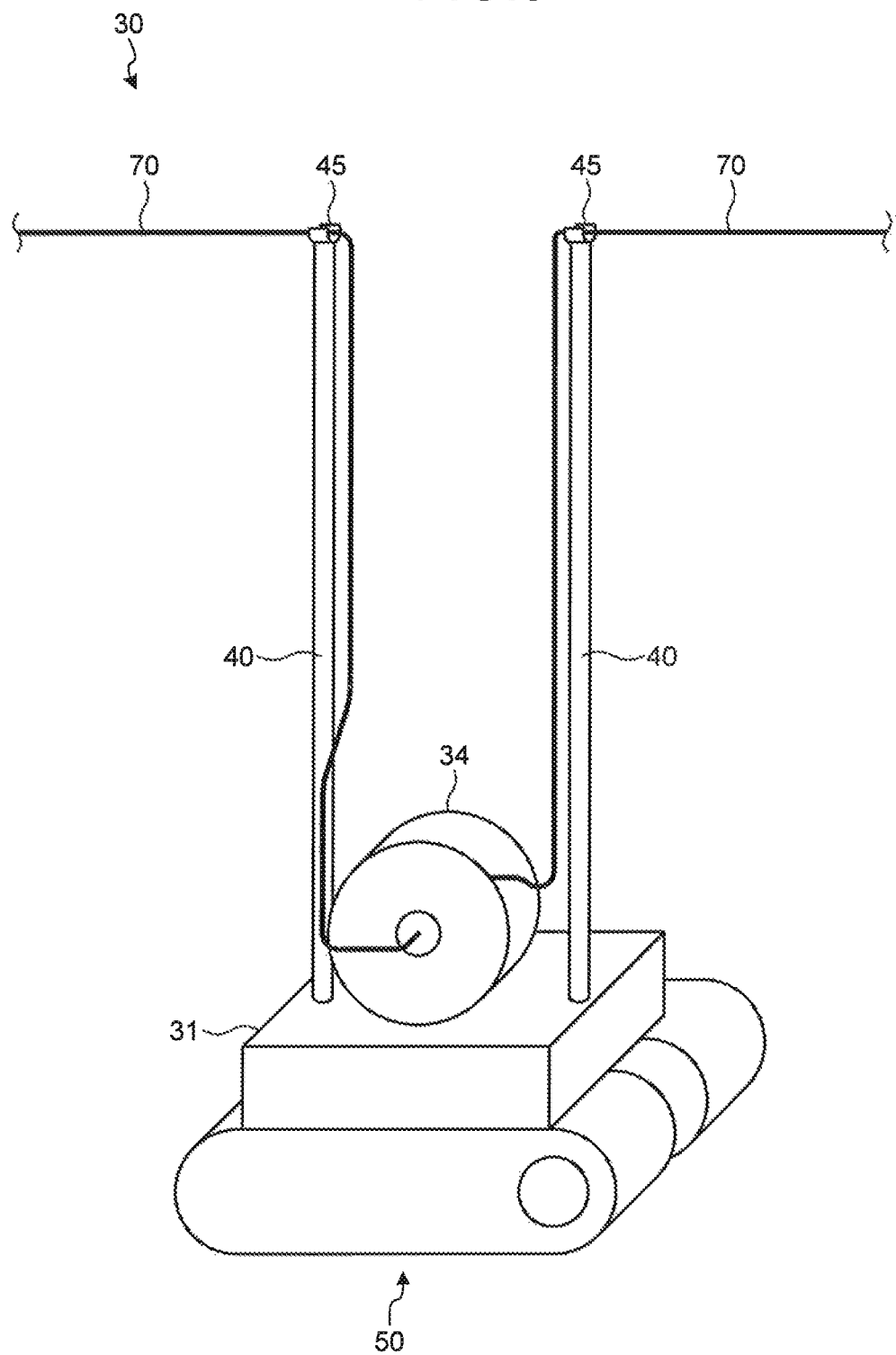
FIG. 9 is a schematic diagram illustrating a modified example of the relay carriage of the first embodiment.

FIG. 3 is a schematic diagram illustrating a modified example of the relay carriage according to the first embodiment. In the relay carriage 30, 90 described above, while one cable support pole 40, 95 only is provided to one relay carriage 30, 90, a plurality of cable support poles 40, 95 may be provided to one relay carriage 30, 90. For example, as illustrated in FIG. 9, two cable support poles 40 may be provided to the relay carriage 30 of the first embodiment. In this case, in the cable 70 wound around the cable drum 34, the part extending outward of the cable drum 34 from the end of the shaft 35 of the cable drum 34 and the part extending outward of the cable drum 34 from the part reeled up on the outer circumference surface of the shaft 35 are supported on the cable support pole 40, respectively. Thereby, in the cable 70 held by the cable drum 34 of the relay carriage 30, both parts extending in two directions from the relay carriage 30 are supported at the positions that are distant from the ground G.

Therefore, in the area where the cable 70 is disposed within the working site in which the excavator 1 is used, the area through which the vehicle can more can be increased. That is, in the area where the cable 70 is disposed, the part where the cable 70 is distant from the ground G can be increased, which allows for the increased area through which other vehicles such as the dump truck 85 and the like can move. Therefore, the interference between the track of the vehicle and the cable 70 is prevented, which can prevent the damage of the cable 70 and allows for the improved productivity.

Further, when the two cable support poles 40 are provided to the relay carriage 30, the cable 70 located between respective relay carriages 30 will be supported by the cable support poles 40 even when three or more relay carriages 30 are used to hold the cable 70. Therefore, the cable 70 can be disposed distant from the ground G over a long distance, which can further ensure the increased area through which other vehicles such as the dump truck 85 and the like can pass and allows for the improved productivity.

Figure 10:
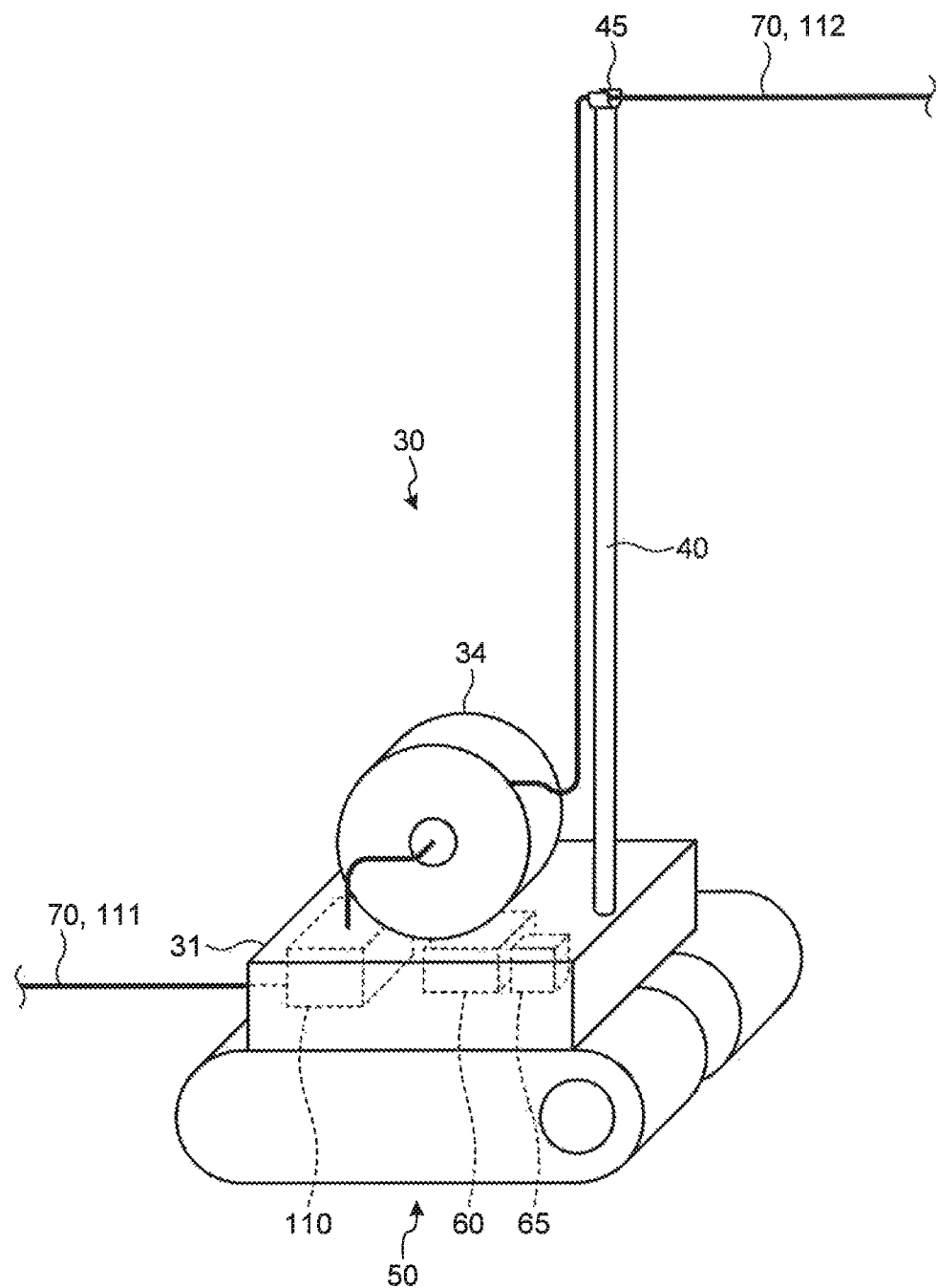
FIG. 10 is a schematic diagram illustrating a modified example of the relay carriage of the first embodiment.

FIG. 10 is a schematic diagram illustrating the modified example of the relay carriage of the first embodiment. While, in the relay carriage 30, 90 described above, the travel device 50 travels by the power of the battery mounted on the relay carriage 30, 90, the traveling operation may be done by electric power supplied through the cable 70. For example, as illustrated in FIG. 10, a power transmission relay unit 110 to which the cable 70 is connected may be provided to the relay carriage 30 of the first embodiment and, further, the traveling motors 12 of the travel device 50 may also be connected to the power transmission relay unit 110 so as to drive the traveling motors 12 by the power supplied by the cable 70.

In details, the relay carriage 30 of the first embodiment holds one cable 70 by the cable drum 34 for providing the relay and, in the relay carriage 30 in this case provides the relay between a power receiving side cable 111 that is the cable 70 configured to receive the power supplied from the power source side and a power transmitting side cable 112 that sends out the power supplied by the power receiving side cable 111. Both of the power receiving side cable 111 and the power transmitting side cable 112 are connected to the power transmission relay unit 110 to relay the transmitted power by the power transmission relay unit 110, and the traveling motors 12 are connected to the power transmission relay unit 110 to supply the power supplied from the power source side by the power receiving side cable 111 to the traveling motor 12. It is noted that the power transmission relay unit 110 may be an apparatus configured to simply provide the electric relay only between the power receiving side cable 111 and the power transmitting side cable 112, or the control unit for providing each control of the relay carriage 30 may also serve as the power transmission relay unit 110.

Further, when the relay carriage 30 provides the relay between the power receiving side cable 111 and the power transmitting side cable 112, the cable drum 34 holds one of their cables 70. For example, the cable drum 34 holds the power transmitting side cable 112 only and reels up the power transmitting side cable 112 as illustrated in FIG. 10. In this case, the power receiving side cable 111 is not reeled up to the cable drum 34 and is directly connected to the power transmission relay unit 110. In the case where the power transmission is relayed at the power transmission relay unit 110 as described above, the cable 70 reeled up by the cable drum 34 may also be the power receiving side cable 111. In this case, the power transmitting side cable 112 is directly connected to the power transmission relay unit 110.

When the relay carriage 30 moves, the traveling motors 52 of the travel device 50 are driven by the power supplied from the power receiving side cable 111 connected to the power transmission relay unit 110, and the relay carriage 30 is driven by this power. As such, the travel device 50 performs the drive operation by the power supplied from the power receiving side cable 111, so that the power can be easily supplied to the traveling motors 52 via the power transmission relay unit 110 to which the cable 70 is connected. This does not require the relay carriage 30 to have the battery mounted, which allows for the suppression of the increase in size and the increase in weight of the relay carriage 30.

Further, as described above, in the case where the power transmission relay unit 110 is provided to the relay carriage 30, 90 and the relay of the power transmitting between the power receiving side cable 111 and the power transmitting side cable 112 is made at the power transmission relay units 110, other electric device than the traveling motor 52 may be connected. For example, in the case where the cable drum 34 is rotatable by the driving force of the electric motor, this electric motor also may be connected to the power transmission relay unit 110 to cause the cable drum 34 to rotate by the power supplied from the power receiving side cable 111.

Figure 11:
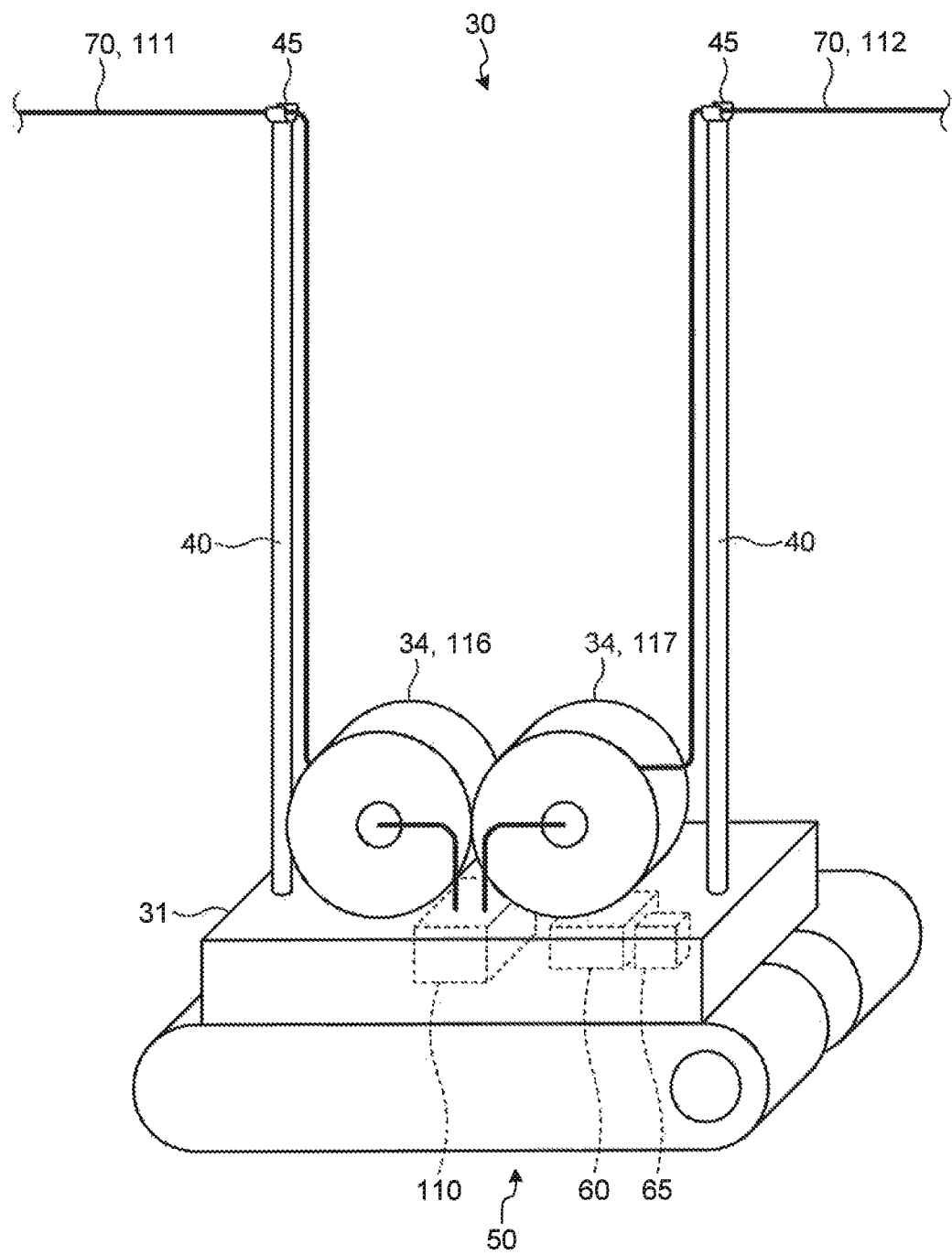
FIG. 11 is a schematic diagram illustrating a modified example of the relay carriage of the first embodiment.

Further, in the case where the relay of power transmission is made between the power receiving side cable 111 and the power transmitting side cable 112 by the relay carriage 30, 90, the cable drums 34 for respective cables 70 may be provided. FIG. 11 is a schematic diagram illustrating a modified example of the relay carriage of the first embodiment. Two cable drums 34 are provided so as to independently reel up the power receiving side cable 111 and the power transmitting side cable 112, respectively, as illustrated in FIG. 11. In this case, the two cable drums 34 are preferably provided so that both are driven by the power supplied by the power receiving side cable 111.

That is, one of the two cable drums 34 is provided as a power receiving side drum 116 to which the power receiving side cable 111 is reeled up so as to allow for the reeling up and the delivering of the power receiving side cable 111. Further, the other cable drum 34 is provided as a power transmitting side drum 117 to which the power transmitting side cable 112 is reeled up and thus is provided so as to be able to reel up and deliver the power transmitting side cable 112. The power receiving side drum 116 and the power transmitting side drum 117 that are able to reel up and deliver the cable 70 as described above are arranged such that their rotation axes are orthogonal to the traveling direction when the relay carriage 30 travels and their rotation axes are aligned in parallel to the traveling direction.

The power receiving side drum 116 and the power transmitting side drum 117 are provided in a manner that they are able to be driven independently by the electronic control device 60, so that the reeling up and the delivering of the power receiving side cable 111 and the power transmitting side cable 112 can be made independently. This allows for the increased adjustment amount of the length of the cable 70 between the devices. For example, in the case where the power transmitting side cable 112 only is reeled up on the cable drum 34 and the power receiving side cable 111 is directly connected to the power transmission relay unit 110, the length of the power transmitting side cable 112 only is adjusted when the distance between the devices such as the distance between the relay carriages 30 is adjusted. In this case, the adjustment amount of the length of the cable 70 between the devices is limited and therefore, when the distance between the devices is increased or the distance between the devices is reduced with the cable 70 unloosen, the adjustment range of this distance will be limited.

In contrast, when the power receiving side drum 116 and the power transmitting side drum 117 are provided, the amount of reeling up and the amount of delivering of the power receiving side cable 111 and the power transmitting side cable 112 can be adjusted by respective cable drums 34, which allows for the increased adjustment amount of the length of the cable 70 between the devices. Therefore, the movable range of each device when the relay carriage 30 moves along with the movement of the excavator 1 can be further increased, which allows for the improved flexibility in the excavating operation and the like by the excavator 1.

Further, while the upper end of the cable support pole 40, 95 is provided with the cable support part 45, 98 and the cable 70 is supported by the cable support pole 40, 95 in the above-described relay carriage 30, 90, other form than described above may be employed for the cable support pole 40, 95 to support the cable 70. For example, the cable support pole 40, 95 may be formed with a hollow member and support the cable 70 such that the cable 70 is put through the inside of the hollow cable support pole 40, 95 and taken out of the upper end of the cable support pole 40, 95. Also in the case where the cable 70 is supported as described above, the cable 70 is connected from the upper end of the cable support pole 40, 95 to other machine and/or device, so that the cable support pole 40, 95 can be supported with the cable 70 being distant from the ground G.

Further, while the above-described relay carriage 30, 90 can be operated by the remote operation in which the operator such as the driver of the excavator 1 and the like who can directly visually recognize the relay carriage 30 uses the remote operating device, the remote operation can be made by other operator. For example, when there is a base station that can remotely monitor the situation of the working site and manage the state of a plurality of working machines, the relay carriage 30, 90 may be operated by the remote operation from the base station. In this case, the video of the working site is sent to the base station and the person at the base station who is watching the video operates the relay carriage 30, 90 by the remote operation. As such, as long as the person who remotely operates the relay carriage 30, 90 can recognize the situation of the working site, any place for the remote operation and any form of the recognition may be applied.

Further, the relay carriage 30, 90 may be operated by other than the remote control, and the relay carriage 30, 90 may be operated by the direct operation. In this case, the relay carriage 30, 90 may be provided with an operating unit such as a joystick and the like that is able to instruct the movement of the relay carriage 30, 90, the rotation of the cable drum 34, the expansion and contraction of the cable support pole 95, and so on, and the relay carriage 30, 90 may be operated by the operation of the operating unit.

Further, while, in the relay carriage 90 of the second embodiment, the cable support pole 95 is expanded when the relay carriage 90 stops moving, the cable support pole 95 is not necessarily expanded even when the relay carriage 90 stops moving. For example, in the case where the cable 70 is held by a plurality of relay carriages 90 and when the track of other vehicle has been decided, the cable support pole 95 only which supports the cable 70 located on the track may be expanded. Thereby, the cable support pole 95 which does not need to be expanded is kept contracted even when the relay carriage 90 is stopped, which can ensure the stability when the relay carriage 90 is stopped and prevent the interference of the track through which other vehicles pass and the cable 70. Therefore, the damage of the cable 70 can be prevented and the safety at the operation by the excavator 1 can be ensured.

Further, while the travel device 50 only is grounded regardless of the movement state in the above-described relay carriage 30, 90, other portions may be grounded. For example, the carriage body 31 may be provided with outriggers that ground on the ground G by a wider grounding area than the grounding area of the travel device 50 so as to ensure the stability of the relay carriage 30, 90 and that is provided in a retractable manner. Since the center of gravity of the cable support pole 40, 95 extending upward from the carriage body 31 is high and, further, the cable 70 supported by the cable support pole 40, 95 is disposed at a high position, the center of gravity of the relay carriage 30, 90 supporting the cable 70 is likely to be high. In particular, since the cable 70 used in the mining machinery is thick and heavy, the center of gravity is likely to be high when the cable 70 is supported by the relay carriage 30, 90. Therefore, the retractable outriggers may be provided to stop the relay carriage 30, 90 in a stable state by grounding the outrigger when the relay carriage 30, 90 is stopped. This can prevent the relay carriage 30, 90 from falling and further ensure the improved safety at the operation of the excavator 1.

Further, while description has been made by using the remote operated excavator 1 as an example for the electric work machine that is supplied with electric power via the above-described relay carriage 30, 90, the electric work machine may be other than those described above. The electric work machine may be other work machine than the excavator 1, that is, any form of machine may be applied as long as it operates by electric power supplied from the external power source 80 and moves with the cable 70 being connected.

REFERENCE SIGNS LIST 1 excavator
2 upper revolving body
8 pump unit
10 lower traveling body
11, 51 crawler belt
12, 52 traveling motor
16 swing circle
20 power supply system
30, 90 relay carriage
31 carriage body
34 cable drum
40, 95 cable support pole
45, 98 cable support part
50 travel device
60 electronic control device
61 movement control unit
70 cable
71 pole side part
72 non-supported side part
80 external power source
85 dump truck
100 supporting member control unit
110 power transmission relay unit
111 power receiving side cable
112 power transmitting side cable
116 power receiving side drum
117 power transmitting side drum

The invention claimed is:
1. A power support system to an electric work machine comprising:
    two pole-attached cable relay carriages; and
    an electric work machine,
    wherein the pole-attached cable relay carriages are located in an operation site in which the electric work machine operates,
    wherein each of the pole-attached cable relay carriages comprises:

a cable holding unit configured to hold a cable that connects an external power source and the electric work machine and that transmits power;

a cable support pole configured to expand and contract and support the cable held by the cable holding unit at a position higher than a height of a dump truck that travels on a track of the dump truck that intersects at a position where the cable is disposed; and a travel device connected to the cable holding unit and the cable support pole and configured to perform a traveling operation so as to be able to move the cable holding unit and the cable support pole;

an electronic control device configured to control the expansion and contraction of the cable support pole and the operation of the travel device; and wherein the electric work machine is configured to be driven by power supplied by the cable that is relayed by the pole-attached cable relay carriage, wherein the cable located between the two pole-attached cable relay carriages is bridged across the track and between the cable support poles of both of the pole-attached cable relay carriages, wherein the pole-attached cable relay carriage at a side of the electric work machine and the pole-attached cable relay carriage at a side of the external power source are located on opposite sides of the track of the dump truck, and the cable is bridged between the cable support poles across the track of the dump truck.

2. The power support system to an electric work machine according to claim 1, wherein the pole-attached cable relay carriage includes a plurality of the cable support poles.

3. The power support system to an electric work machine according to claim 1, wherein the cable support pole is configured to be able to support the cable so as to change a height of the cable from a ground.

4. The power support system to an electric work machine according to claim 1, wherein the cable holding unit is configured to be able to reel up and deliver the cable, and is configured to be able to adjust a height of the cable from a ground by adjusting an amount of a reeling up of the cable.

5. The power support system to an electric work machine according to claim 1, wherein the travel device is configured to perform the traveling operation by power supplied by the cable.

6. The power support system to an electric work machine according to claim 1, wherein the cable support pole is controlled to expand to a position such that the cable is higher than the dump truck, or contract, based on whether the pole-attached cable relay carriage is moving.

* * * * *